United States Patent
Kanai et al.

(10) Patent No.: US 10,090,538 B2
(45) Date of Patent: Oct. 2, 2018

(54) MANUFACTURING METHOD AND MANUFACTURING APPARATUS OF ELECTRODE FRAME ASSEMBLY FOR FUEL CELL

(71) Applicant: TOYOTA JIDOSHA KABUSHIKI KAISHA, Toyota-shi, Aichi-ken (JP)

(72) Inventors: Nobuo Kanai, Toyota (JP); Tomokazu Hayashi, Seto (JP); Keisuke Mizuno, Toyota (JP); Hiroshi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 268 days.

(21) Appl. No.: 14/900,693

(22) PCT Filed: Dec. 19, 2014

(86) PCT No.: PCT/JP2014/006345
§ 371 (c)(1),
(2) Date: Dec. 22, 2015

(87) PCT Pub. No.: WO2015/098068
PCT Pub. Date: Jul. 2, 2015

(65) Prior Publication Data
US 2016/0293976 A1 Oct. 6, 2016

(30) Foreign Application Priority Data

Dec. 27, 2013 (JP) .................................. 2013-270768
Nov. 10, 2014 (JP) .................................. 2014-227763

(51) Int. Cl.
*H01M 8/0273* (2016.01)
*H01M 8/0276* (2016.01)
(Continued)

(52) U.S. Cl.
CPC ....... *H01M 8/0273* (2013.01); *H01M 8/0276* (2013.01); *H01M 8/0297* (2013.01);
(Continued)

(58) Field of Classification Search
CPC ............. H01M 8/0271; H01M 8/0273; H01M 8/0276; H01M 8/0286; H01M 8/0297;
(Continued)

(56) References Cited

U.S. PATENT DOCUMENTS

2002/0192532 A1  12/2002  Inagaki et al.
2004/0099364 A1*  5/2004  Suzuki .................... B32B 18/00
                                                    156/89.11
(Continued)

FOREIGN PATENT DOCUMENTS

CN    201179668 Y    1/2009
JP    H10-199551 A    7/1998
(Continued)

*Primary Examiner* — Ula Corinna Ruddock
*Assistant Examiner* — Matthew W Van Oudenaren
(74) *Attorney, Agent, or Firm* — Finnegan, Henderson, Farabow, Garrett & Dunner LLP

(57) ABSTRACT

The purpose is to suppress positional misalignment between the diffusion layer and the frame. The manufacturing method of an electrode frame assembly for fuel cell comprises the steps of: (a) placing a frame and a diffusion layer to be stacked on each other; and (b) punching out the diffusion layer and the frame in the stacked state to form in the frame an opening in a shape matching with the punched-out diffusion layer.

16 Claims, 15 Drawing Sheets

(51) Int. Cl.
*H01M 8/0297* (2016.01)
*H01M 8/1004* (2016.01)
*H01M 4/88* (2006.01)
*H01M 8/24* (2016.01)
*H01M 8/0271* (2016.01)
*H01M 8/0286* (2016.01)
*H01M 8/2404* (2016.01)
*H01M 8/1018* (2016.01)

(52) U.S. Cl.
CPC ........ *H01M 8/1004* (2013.01); *H01M 4/8896* (2013.01); *H01M 8/0271* (2013.01); *H01M 8/0286* (2013.01); *H01M 8/24* (2013.01); *H01M 8/2404* (2016.02); *H01M 2008/1095* (2013.01); *Y02P 70/56* (2015.11)

(58) Field of Classification Search
CPC .... H01M 8/1004; H01M 8/24; H01M 8/2404; H01M 2008/1095; H01M 4/8896
See application file for complete search history.

(56) References Cited

U.S. PATENT DOCUMENTS

| | | | |
|---|---|---|---|
| 2009/0017362 | A1 | 1/2009 | Hayashi et al. |
| 2009/0255632 | A1* | 10/2009 | Park ........................ B32B 39/00 156/353 |
| 2010/0167176 | A1* | 7/2010 | Kawai ................... H01M 4/881 429/523 |

FOREIGN PATENT DOCUMENTS

| | | |
|---|---|---|
| JP | 2003-77499 | 3/2003 |
| JP | 2005-129343 | 5/2005 |
| JP | 2005-135655 A | 5/2005 |
| JP | 2006-32041 | 2/2006 |
| JP | 2007-141739 | 6/2007 |
| JP | 2008-123812 | 5/2008 |
| JP | 2008-146872 | 6/2008 |
| JP | 2014-225335 | 12/2014 |
| WO | WO 2007/105740 A1 | 9/2007 |

\* cited by examiner

MANUFACTURING METHOD AND MANUFACTURING APPARATUS OF ELECTRODE FRAME ASSEMBLY FOR FUEL CELL

CROSS-REFERENCE TO RELATED APPLICATIONS

This application is a national phase application of International Application No. PCT/JP2014/006345, filed Dec. 19, 2014, and claims the priority of Japanese Application Nos. 2013-270768, filed Dec. 27, 2013, and 2014-227763, filed Nov. 10, 2014, the content of all of which is incorporated herein by reference.

TECHNICAL FIELD

The present invention relates to a manufacturing method and a manufacturing apparatus of an electrode frame assembly for fuel cell.

BACKGROUND ART

Patent Literature 1 describes a membrane electrode assembly, a fuel cell using the membrane electrode assembly and manufacturing methods of the membrane electrode assembly and the fuel cell. The method of Patent Literature 1 forms electrode catalyst layers at predetermined intervals on a belt-like electrolyte membrane, places diffusion layers (GDL) smaller than the electrode catalyst layers on the respective electrode catalyst layers, and places a frame with openings on the electrolyte membrane such that the diffusion layer is fit in the opening of the frame, so as to manufacture the membrane electrode assembly.

CITATION LIST

Patent Literature

[PTL1] JP2005-129343 A

SUMMARY OF INVENTION

Technical Problem

In the process of placing the frame on the electrolyte membrane, it is preferable that the diffusion layer is not laid on the frame but is surely fit in the opening of the frame. There is, however, a need to take into account the punching-out dimensional tolerance of the diffusion layer, the placing tolerance of the diffusion layer, the molding or punching-out tolerance of the frame and the placing tolerance of the frame. By taking into account such tolerances, the method of Patent Literature 1 forms the size (are) of the opening of the frame relatively larger than the size (area) of the diffusion layer, in order to make the diffusion layer surely fit in the opening of the frame. This may result in a large clearance between the periphery of the opening of the frame and the diffusion layer. More specifically, by taking into account the tolerances involved in fitting the diffusion layer in the frame, the clearance between the frame and diffusion layer is likely to be as large as about 2 mm. In the presence of such a large clearance, the electrolyte membrane is likely to be swollen and shrunk and thereby to be moved in the clearance between the frame and the diffusion layer. This may lead to a problem that that the electrolyte membrane is damaged.

The prior art accordingly has the following problems. The first problem is attributed to a large clearance between the frame and the diffusion layer. This makes the overall size (area) of the fuel cell including the frame significantly larger than the size (area) of the power generation area (electrode catalyst layer). This accordingly increases the cell size and increases the cost. As the second problem, when the clearance between the frame and the diffusion layer is not completely filled with an adhesive but is left, the electrolyte membrane (and the catalyst electrode layer) is exposed on the clearance. This may result in early deterioration of the cell performance.

Solution to Problem

In order to solve at least part of the above problems, the invention may be implemented by any of the following aspects.

(1) According to one aspect of the invention, there is provided a manufacturing method of an electrode frame assembly for fuel cell. The manufacturing method of an electrode frame assembly for fuel cell comprises the steps of (a) placing a frame and a diffusion layer to be stacked; and (b) punching out the diffusion layer and the frame in the stacked state to form in the frame an opening in a shape matching with the punched-out diffusion layer. According to this aspect, the shape of the punched-out diffusion layer matches with the shape of the opening of the frame. This substantially eliminates the placing tolerance of the diffusion layer and the placing tolerance of the frame and thereby allows for downsizing of a fuel cell.

(2) The manufacturing method of the electrode frame assembly for fuel cell according to the above aspect may further comprise the step of fitting the punched-out diffusion layer in the opening of the frame while keeping positions of the punched-out diffusion layer and the frame in a width direction and in a length direction, during or after the step (b). The manufacturing method of this aspect joins the diffusion layer and the frame with each other, while keeping the positions of the punched-out diffusion layer and the frame in the width direction and in the length direction. According to this aspect, this aspect allows the diffusion layer and the frame to be joined with each other without taking into account the placing tolerance of the diffusion layer and the placing tolerance of the frame. As a result, this allows for downsizing of the fuel cell and simplifies the manufacturing process.

(3) The manufacturing method of the electrode frame assembly for fuel cell according to the above aspects, wherein the punched out shape may be an approximately rectangular shape and may have a fitting shape in at least one location among sides and corners of the approximately rectangular shape. The manufacturing method of this aspect makes it unlikely to slip off the frame and the diffusion layer from each other during conveyance. As a result, this simplifies the manufacturing process.

(4) The manufacturing method of the electrode frame assembly for fuel cell according to the above aspects, wherein the fitting shape may be a protruding shape protruded from an outer periphery of the approximately rectangular shape in the punched-out diffusion layer, and may be provided on a side of the approximately rectangular shape parallel to a conveying direction of the frame or a corner of the approximately rectangular shape. The manufacturing method of this aspect makes it more unlikely to slip off the frame and the diffusion layer from each other during conveyance.

(5) The manufacturing method of the electrode frame assembly for fuel cell according to the above aspects, wherein the fitting shape in the punched-out diffusion layer may include a sweepback portion having a sweepback angle relative to the conveying direction. The manufacturing method of this aspect makes it more unlikely to slip off the frame and the diffusion layer from each other during conveyance.

(6) The manufacturing method of the electrode frame assembly for fuel cell according to the above aspects, wherein the punching out the diffusion layer and the frame in the stacked state in the step (b) may comprise punching from a diffusion layer side of the stack obliquely to a normal direction of the diffusion layer, such that a size of a frame side surface of the punched-out diffusion layer in the normal direction is smaller than a size of an opposite side surface of the punched-out diffusion layer opposite to the frame side surface in the normal direction. According to this aspect, the punched-out diffusion layer is smaller on the frame side and larger on the opposite side. The punched frame is, on the other hand, larger on the diffusion layer side and smaller on the opposite side. This configuration facilitates supporting the punched-out diffusion layer by the punched frame.

(7) The manufacturing method of the electrode frame assembly for fuel cell according to the above aspects, wherein the diffusion layer may be made of carbon paper. According to this aspect, the diffusion layer is made of carbon paper which is firm to make the diffusion layer unlikely to be slipped off from the frame.

(8) The manufacturing method of the electrode frame assembly for fuel cell according to the above aspects, wherein the frame may be made of a transparent resin. According to this aspect, the frame is made of a transparent resin and allows the electrode frame assembly for fuel cell to be visually checked from the frame side. This facilitates positioning of the electrode frame assembly for fuel cell relative to another member, for example, a catalyst coated membrane.

(9) According to one aspect of the invention, there is provided a manufacturing apparatus of an electrode frame assembly for fuel cell. The manufacturing apparatus of an electrode frame assembly for fuel cell comprise: a first roller which a sheet of diffusion layer is wound on; a second roller which a sheet of frame is wound on; a conveying device that is configured to convey the sheet of diffusion layer and the sheet of frame; and a punching device that is configured to simultaneously punch the sheet of diffusion layer and the sheet of frame in a stacked state to form in the frame an opening in a shape matching with the punched-out diffusion layer. According to this aspect, the shape of the punched-out diffusion layer matches with the shape of the opening of the frame. This substantially eliminates the placing tolerance of the diffusion layer and the placing tolerance of the frame and thereby allows for downsizing of a fuel cell.

(10) The manufacturing apparatus of the electrode frame assembly for fuel cell according to the above aspect, wherein the punching device may comprise: blades that are provided for punching; and a pressing member that is configured to press the punched-out diffusion layer and make the punched-out diffusion layer fit in the opening of the frame when the blades are pulled back after the punching. The manufacturing apparatus of this aspect joins the diffusion layer and the frame with each other, while keeping the positions of the punched-out diffusion layer and the frame in the width direction and in the length direction. This suppresses positional misalignment between the diffusion layer and the frame.

(11) The manufacturing apparatus of the electrode frame assembly for fuel cell according to the above aspects, wherein the punched out shape may be an approximately rectangular shape and may have a fitting shape in at least one location among sides and corners of the approximately rectangular shape. The manufacturing method of this aspect makes it unlikely to slip off the frame and the diffusion layer from each other during conveyance. As a result, this simplifies the manufacturing process.

(12) The manufacturing apparatus of the electrode frame assembly for fuel cell according to the above aspects, wherein the fitting shape may be a protruding shape protruded from an outer periphery of the approximately rectangular shape in the punched-out diffusion layer, and may be provided on a side of the approximately rectangular shape parallel to a conveying direction of the frame or a corner of the approximately rectangular shape. The manufacturing method of this aspect makes it more unlikely to slip off the frame and the diffusion layer from each other during conveyance.

(13) The manufacturing apparatus of the electrode frame assembly for fuel cell according to the above aspects, wherein the fitting shape in the punched-out diffusion layer may include a sweepback portion having a sweepback angle relative to the conveying direction. This aspect makes the diffusion layer unlikely to be slipped off from the frame during conveyance.

(14) The manufacturing apparatus of the electrode frame assembly for fuel cell according to the above aspects, wherein a punched out shape may be a rectangular shape, and blades provided to punch two opposed sides of the rectangular shape may be arranged to punch the sheet of diffusion layer and the sheet of frame from a diffusion layer side obliquely to a normal direction of the diffusion layer, such that a size of a frame side of the punched-out diffusion layer in the normal direction is smaller than a size of an opposite side of the punched-out diffusion layer in the normal direction. According to this aspect, the punched-out diffusion layer is smaller on the frame side and larger on the opposite side. The punched frame is, on the other hand, larger on the diffusion layer side and smaller on the opposite side. This configuration facilitates supporting the punched-out diffusion layer by the punched frame.

(15) The manufacturing apparatus of the electrode frame assembly for fuel cell according to the above aspects, wherein the diffusion layer may be made of carbon paper. According to this aspect, the diffusion layer is made of carbon paper which is firm to make the diffusion layer unlikely to be slipped off from the frame.

(16) The manufacturing apparatus of the electrode frame assembly for fuel cell according to the above aspects, wherein the frame may be made of a transparent resin. According to this aspect, the frame is made of a transparent resin and allows the electrode frame assembly for fuel cell to be visually checked from the frame side. This facilitates positioning of the electrode frame assembly for fuel cell relative to another member, for example, a catalyst coated membrane.

The invention may be implemented by a variety of aspects, for example, a manufacturing method of a fuel cell, other than the manufacturing method of the electrode frame assembly for fuel cell and the manufacturing apparatus of the electrode frame assembly for fuel cell of the above aspects.

DESCRIPTION OF EMBODIMENT

First Embodiment

Figure 1:
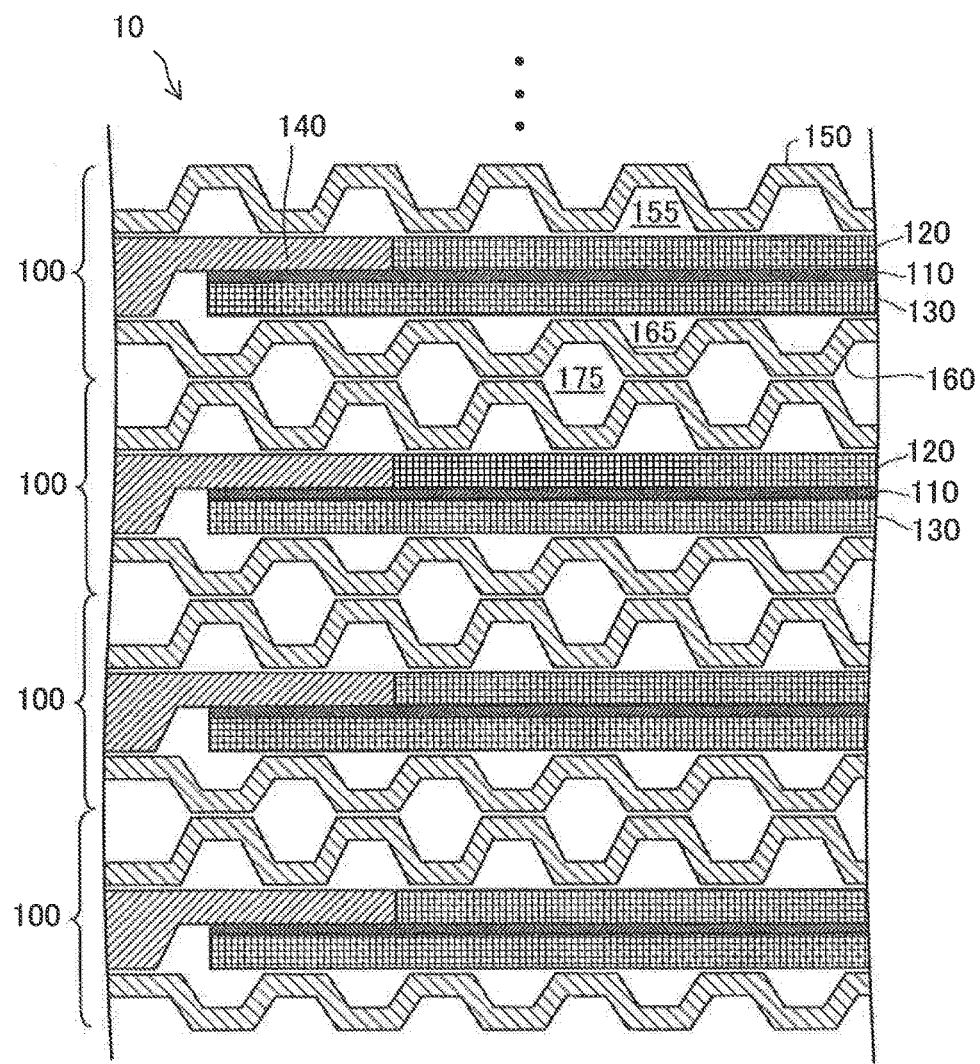
FIG. 1 is a sectional view illustrating the schematic configuration of a fuel cell stack.

FIG. 1 is a sectional view illustrating the schematic configuration of a fuel cell stack 10. The fuel cell stack 10 is configured to include a plurality of power generation units 100 arranged in series. The power generation unit 100 includes a catalyst coated membrane 110 (hereinafter referred to as "CCM 110"), a cathode diffusion layer 120, an anode diffusion layer 130, a frame 140 for reinforcement and separator plates 150 and 160. The CCM 110 includes a proton-conductive electrolyte membrane having respective surfaces coated with a cathode catalyst layer and an anode catalyst layer. According to one embodiment, the entire area of a first surface of the electrolyte membrane is coated with the anode catalyst layer, while only a rectangular area (power generation area) that is part of a second surface of the electrolyte membrane is coated with the cathode catalyst layer. This is attributed to the following reason. The anode catalyst layer needs a less amount of a catalyst per unit area than the cathode catalyst layer (typically ½ or less, for example, about ⅓). Coating the entire area of the first surface of the electrolyte membrane with the catalyst accordingly simplifies the coating process, while not excessively wasting the catalyst. The cathode catalyst layer, on the contrary, needs a larger amount of the catalyst per unit area than the anode catalyst layer. Coating only a partial smaller area with the catalyst accordingly reduces the waste of the catalyst.

The cathode diffusion layer 120 and the anode diffusion layer 130 are made of, for example, carbon paper or carbon non-woven fabric. The cathode diffusion layer 120 is fit in an opening of the frame 140 and is conveyed along with the frame 140 in a manufacturing process described later. A firm material is thus desirably employed for the cathode diffusion layer 120, in order to prevent the cathode diffusion layer 120 from being slipped off from the opening during conveyance. From this standpoint, carbon paper rather than carbon non-woven fabric is preferable for the cathode diffusion layer 120. The CCM 110 integrated with the cathode diffusion layer 120 and the anode diffusion layer 130 is called membrane electrode assembly or membrane electrode gas diffusion layer assembly. In the description below, the membrane electrode assembly or the membrane electrode gas diffusion layer assembly is referred to as "MEA". The frame 140 is preferably made of an ultraviolet transmitting material such as polypropylene and is especially preferably made of a transparent material. The MEA integrated with the frame 140 is called "electrode frame assembly for fuel cell".

The cathode diffusion layer 120 is placed on one surface of the CCM 110, and the anode diffusion layer 130 is placed on the other surface of the CCM 110. According to this embodiment, the anode diffusion layer 130 is formed in substantially the same dimensions as those of the electrolyte membrane of the CCM 110. The cathode diffusion layer 120 is, on the other hand, formed in smaller dimensions than those of the electrolyte membrane of the CCM 110 and the anode diffusion layer 130. The cathode diffusion layer 120 is formed in a smaller configuration than that of the cathode catalyst layer and is placed within the area of the cathode catalyst layer. This is attributed to the following reason. In the application that the cathode diffusion layer 120 is made of carbon paper, when an end of the cathode diffusion layer 120 is located at a position of the electrolyte membrane that is not coated with the catalyst layer, there is a possibility that the fibers of carbon paper stick into the electrolyte membrane to damage the electrolyte membrane and cause cross leaking.

The frame 140 is provided as a plate-like member for reinforcement and is placed to surround the entire circumference of the outer peripheries of the CCM 110, the cathode diffusion layer 120 and the anode diffusion layer 130. According to this embodiment, the frame 140 is bonded to an outer area protruded from the cathode diffusion layer 120 on one surface of the CCM 110. This area of the CCM 110 bonded to the frame 140 is not involved in power generation, since a reactive gas is not diffused to this area. The cathode catalyst layer may thus not be formed in this area. In other words, the frame 140 may be bonded to the electrolyte membrane of the CCM 110. This reduces the use amount of the catalyst metal that is a noble metal at this bonded part. In the case where the cathode diffusion layer 120 is made of carbon paper, however, the area of the cathode catalyst layer may be formed to be slightly larger than the area of the cathode diffusion layer 120, in order to prevent the fibers of carbon paper from sticking into the electrolyte membrane as described above.

The separator plates 150 and 160 are metal plate-like members having concavo-convex configurations. An oxygen flow path 155 is formed between the separator plate 150 and the cathode diffusion layer 120. A hydrogen flow path 165 is formed between the separator plate 160 and the anode diffusion layer 130. A cooling medium flow path 170 is formed between the separator plate 150 and the separator plate 160.

FIGS. 2A-2F are diagrams illustrating a manufacturing process of an electrode frame assembly for fuel cell 180 according to this embodiment. The following first briefly describes the differences from a conventional manufacturing process described later. The conventional manufacturing process first forms an MEA with diffusion layers and subsequently places the frame 140 on the MEA such that the cathode diffusion layer of the MEA is fit in an opening of the frame 140 to manufacture the electrode frame assembly for fuel cell 180. The manufacturing process of the embodiment, on the other hand, lays a sheet material of the cathode diffusion layer 120 (called "cathode diffusion layer sheet 120s") on a sheet material of the frame 140 (called "frame sheet 140s"), simultaneously punches out the layered sheets 120s and 140s to form a frame diffusion layer assembly having the cathode diffusion layer 120 fit in the frame 140, and subsequently joins the frame diffusion layer assembly with the anode diffusion layer 130 that is integrated with the CCM 110, so as to manufacture the electrode frame assembly for fuel cell 180.

Figure 2A:
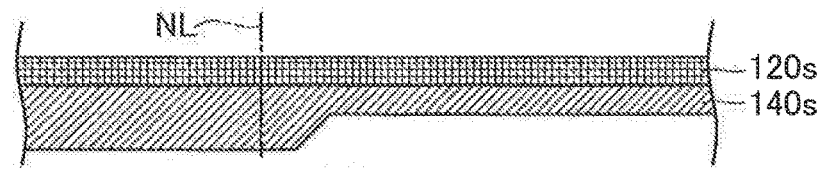
FIGS. 2A-2F are diagrams illustrating a manufacturing process of an electrode frame assembly for fuel cell according to this embodiment.

In FIG. 2A, the cathode diffusion layer sheet 120s is laid on the frame sheet 140s. The frame sheet 140s and the cathode diffusion layer sheet 120s are both sheets without openings. In this illustrated example, the frame sheet 140s has an area of thinner wall thickness on which an anode diffusion layer sheet 130s is stacked.

Figure 2B:
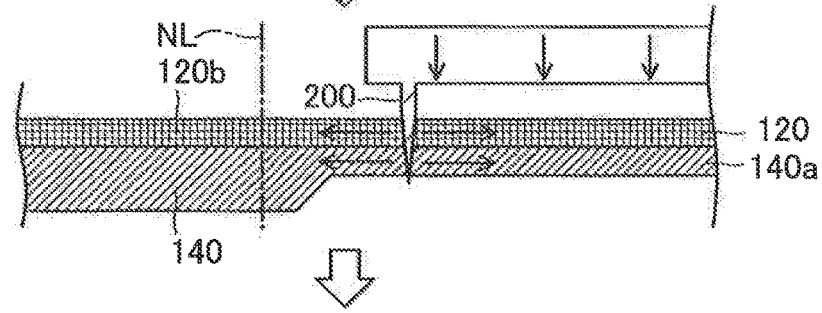

In FIG. 2B, Thomson blades (chisel or pinnacle blades) 200 (hereinafter called "blades 200") that are capable of punching out a member in an approximately rectangular shape are inserted from the cathode diffusion layer sheet 120s-side to punch the cathode diffusion layer sheet 120s and the frame sheet 140s. The moving direction of the blades 200 is parallel to a normal NL of the cathode diffusion layer sheet 120s. The approximately rectangular punched-out members are called the cathode diffusion layer 120a and a frame remaining part 140a. Frame-like members left by punching out the approximately rectangular members are called a cathode diffusion layer remaining part 120b and the frame 140. When the blades 200 are inserted, the cathode diffusion layer 120 and the frame 140 receive compression stress from the blades 200.

Figure 2C:
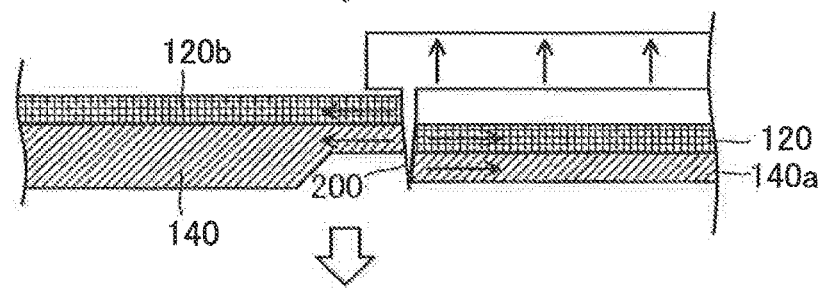

In the state of FIG. 2C, the blades 200 are pressed in such that the upper surface of the cathode diffusion layer 120 is flush with the upper surface of the frame 140, and is subsequently pulled out with keeping the flushness. By pulling out the blades 200, the frame remaining part 140a placed between the blades 200 falls down, and the cathode diffusion layer 120 is fit in the frame 140 with keeping its position in the width direction and in the length direction. The cathode diffusion layer 120 is aligned with the opening of the frame 140.

Figure 2D:
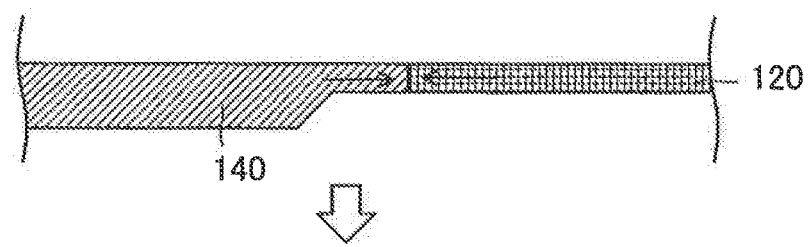

FIG. 2D shows the state that the cathode diffusion layer 120 is fit in the frame 140. In this state, stresses in mutually compressing directions are applied between the cathode diffusion layer 120 and the fame 140, so that the cathode diffusion layer 120 is held by the frame 140. In terms of ensuring stronger holding (fitting), a material having a certain level of rigidity such as carbon paper is preferable for the cathode diffusion layer 120. The cathode diffusion layer 120 held by the frame 140 is called "frame diffusion layer assembly 400".

Figure 2E:
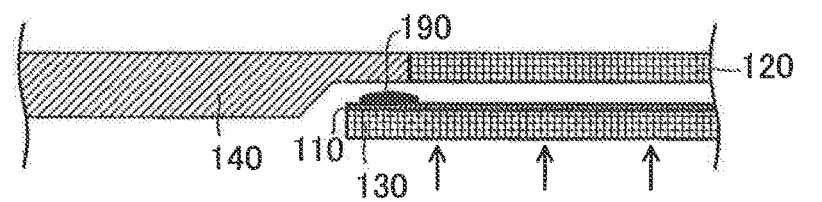
Figure 2F:
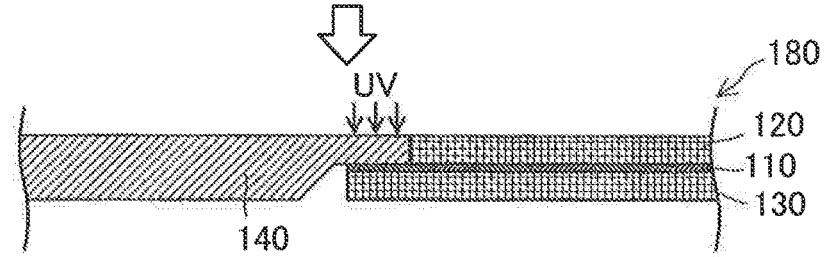

In FIG. 2E, the frame diffusion layer assembly 400 is bonded to the CCM 110 by means of an adhesive 190. The CCM 110 is integrated with the anode diffusion layer 130 on its one surface (lower surface) and has the adhesive 190 applied on an outer periphery of the other surface (upper surface) of the CCM 110. The adhesive 190 may be, for example, an ultraviolet curable adhesive. In the case where the frame 140 is made of an ultraviolet transmitting material, irradiation of the frame 140 with ultraviolet rays emitted from the cathode side cures the adhesive 190. The adhesive 190 may be spread to the cathode diffusion layer 120. FIG. 2F shows the electrode frame assembly for fuel cell 180 thus manufactured.

Figure 3A:
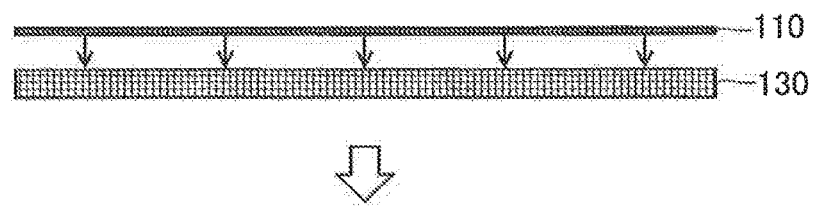
FIGS. 3A-3E are diagrams illustrating a conventional manufacturing process of an electrode frame assembly for fuel cell.
Figure 3B:
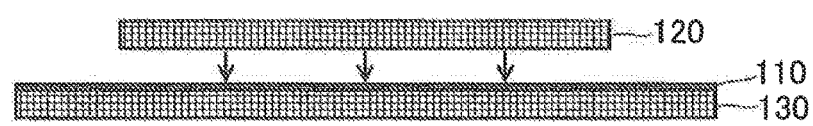
Figure 3C:
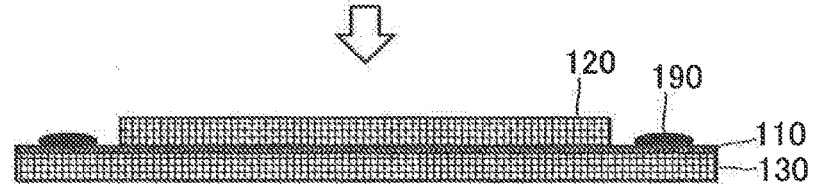
Figure 3D:
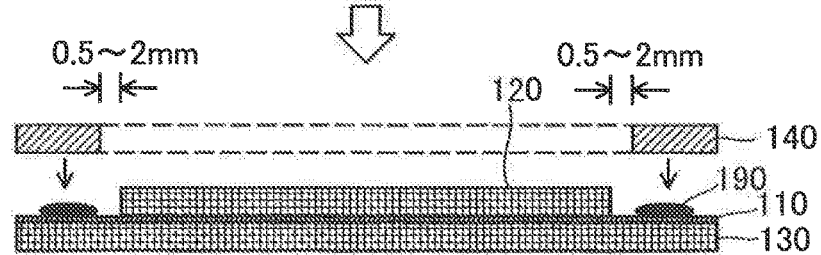
Figure 3E:
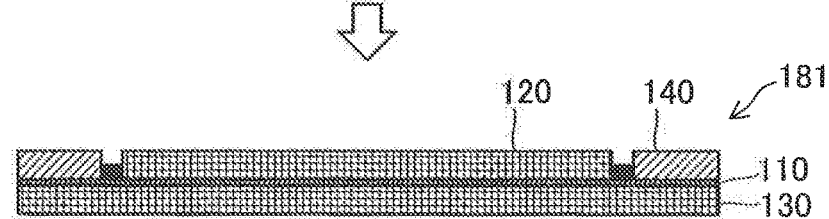

FIGS. 3A-3E are diagrams illustrating a conventional manufacturing process of an electrode frame assembly for fuel cell. In FIG. 3A, an anode diffusion layer 130 is joined with a CCM 110. In FIG. 3B, a cathode diffusion layer 120 having the smaller size than the size of the CCM 110 is placed on the CCM 110, so that an MEA is formed. In FIG. 3C, an adhesive 190 is applied on the CCM 110 outside of the cathode diffusion layer 120. In FIG. 3D, a frame 140 having an opening is placed over the MEA. FIG. 3E shows an electrode frame assembly for fuel cell 181 thus manufactured.

The conventional manufacturing process simultaneously performs fitting of the cathode diffusion layer 120 into the opening of the fame 140 and bonding the frame 140 to the CCM 110. Tolerances and errors are generally provided in the process of forming and in the process of placing the opening of the frame 140 and the cathode diffusion layer 120. The tolerances include punching size tolerance of the diffusion layer, placing tolerance of the diffusion layer and placing tolerance of the frame. Even in the presence of such tolerances and errors, in order to prevent the outer periphery of the cathode diffusion layer 120 from being laid on the frame 140, the conventional manufacturing process forms the size of the opening of the frame 140 to be larger than the size of the cathode diffusion layer 120. Accordingly, the electrode frame assembly for fuel cell 181 has a clearance of about 0.5 mm to 2 mm between the cathode diffusion layer 120 and the opening of the frame 140. This leads to the problems of (a) expanding the size of the electrode frame assembly for fuel cell and (b) decreasing the durability of the CCM 110 when the clearance is not completely fillable with the adhesive 190.

In the conventional manufacturing process, considerable attention is required for placing the cathode diffusion layer 120, because of the following reasons. As described above, the cathode diffusion layer 120 is generally formed in the smaller configuration than that of the cathode catalyst layer and is placed within the area of the cathode catalyst layer. This is attributed to the following reason. In the application that the cathode diffusion layer 120 is made of carbon paper, when an end of the cathode diffusion layer 120 is located at a position of the electrolyte membrane that is not coated with the catalyst layer, there is a possibility that the fibers of carbon paper stick into the electrolyte membrane to damage the electrolyte membrane and cause cross leaking. In order to prevent such damage or cross leaking, it is preferable to place the cathode diffusion layer 120 within the area of the cathode catalyst layer. For this purpose, each cathode diffusion layer 120 is placed on the CCM 110 with careful attention.

In the manufacturing process of the embodiment described with reference to FIGS. 2A-2F, the opening of the frame 140 and the cathode diffusion layer 120 are formed by the same blades 200, so that no clearance is provided between the cathode diffusion layer 120 and the opening of the frame 140. In the manufacturing process of this embodiment, the cathode diffusion layer 120 is fit into the opening of the frame 140 in the course of pulling out the blades 200. The cathode diffusion layer 120 has already been fit in the opening of the frame 140 at the time when the frame 140 is bonded to the CCM 110. There is accordingly no possibility that the outer periphery of the cathode diffusion layer 120 is laid on the frame 140. This manufacturing process also substantially eliminates the placing tolerance of the cathode diffusion layer 120 and the placing tolerance of the frame 140. This reduces the size of the frame 140 and thereby downsizes a fuel cell.

Additionally, according to this embodiment, when the frame 140 is made of a transparent resin, the adhesive 190 is curable with rays such as ultraviolet rays. This also allows the positioning of the frame diffusion layer assembly 400 with the CCM 110 (FIG. 2E) to be visually checked from the frame 140-side. This accordingly ensures positioning of the frame diffusion layer assembly 400 with the CCM 110 (more specifically, positioning of the cathode diffusion layer 120 with the cathode catalyst layer of the CCM 110) with high accuracy.

Figure 4:
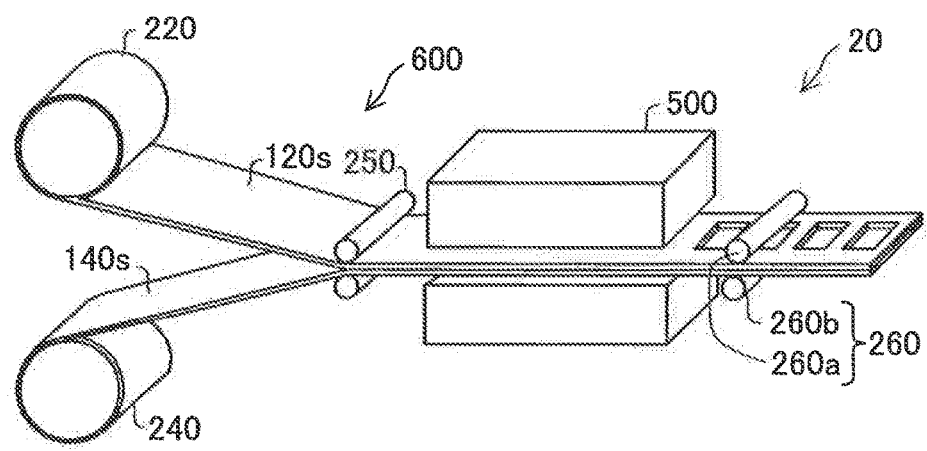
FIG. 4 is a diagram illustrating part of a manufacturing apparatus of the electrode frame assembly for fuel cell.

FIG. 4 is a diagram illustrating part of a manufacturing apparatus 20 of the electrode frame assembly for fuel cell 180. The manufacturing apparatus 20 includes a punching device 500 and a conveying device 600. The conveying device 600 includes a diffusion layer sheet feeding roller 220, a frame sheet feeding roller 240 and conveying rollers 250 and 260. The diffusion layer sheet feeding roller 220 has the cathode diffusion layer sheet 120s wound thereon and is configured to feed the cathode diffusion layer sheet 120s. The frame sheet feeding roller 240 has the frame sheet 140s wound thereon and is configured to feed the frame sheet 140s.

The conveying rollers 250 convey the cathode diffusion layer sheet 120s and the frame sheet 140s in the layered state to the punching device 500. The punching device 500 has the blades 200 described above with reference to FIGS. 2A-2F and is operated to punch out the cathode diffusion layer 120 from the cathode diffusion layer sheet 120s, form an opening in the frame sheet 140s and fit the cathode diffusion layer 120 in the opening of the frame sheet 140s in the course of pulling out the blades 200. A conveying roller 260a on the cathode diffusion sheet 120s-side of the conveying rollers 260 has substantially the same width as the width of the cathode diffusion layer sheet 120s, while a conveying roller 260b on the frame sheet 140-side is divided into two sections. The two sections of the conveying roller 260b are arranged to be slightly larger than the width of the cathode diffusion layer 120.

Figure 5A:
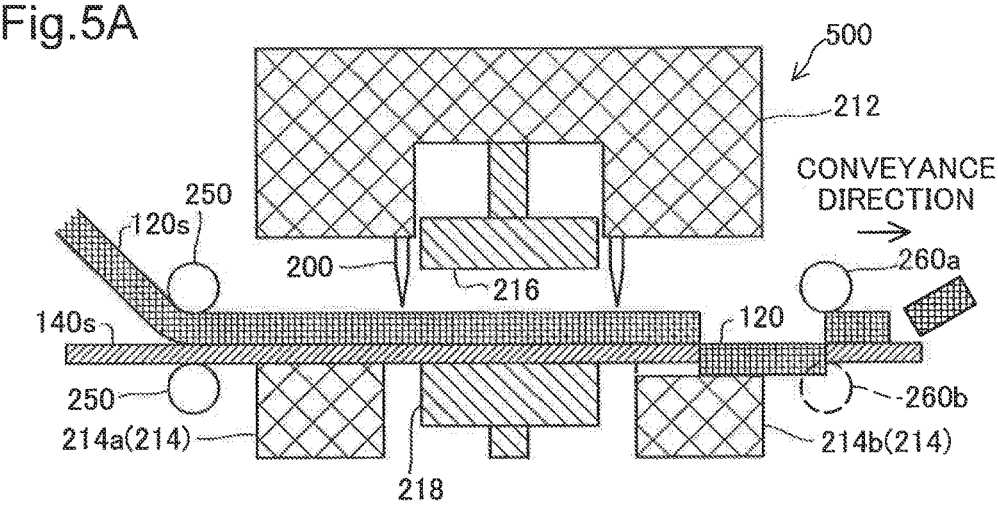
FIGS. 5A-5C are diagrams illustrating the internal configuration and the operations of the punching device.
Figure 5B:
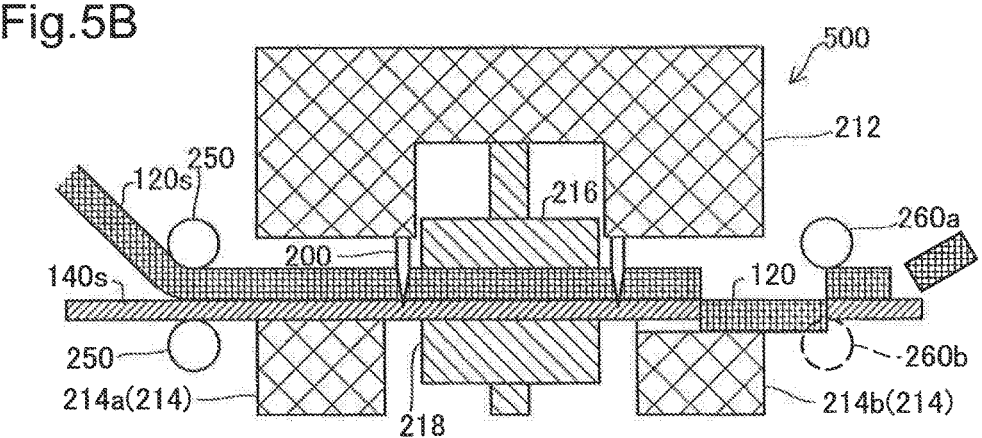
Figure 5C:
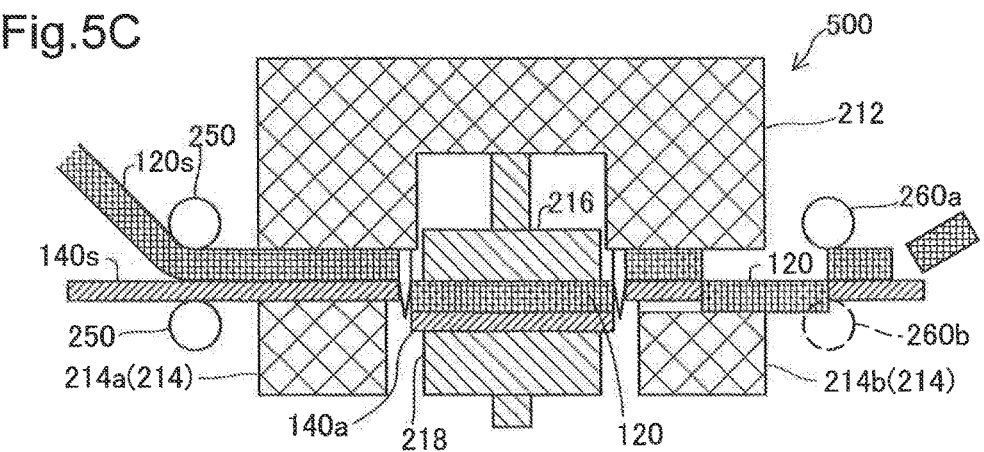

FIGS. 5A-5C are diagrams illustrating the internal configuration and the operations of the punching device 500. The punching device 500 includes the blades 200, an upper casing 212, a lower base 214, an upper pressing member 216 and a lower pressing member 218. These pressing members 216 and 218 are preferably made of an elastic material (for example, cushioning material like foamed material). The cathode diffusion layer 120 fit in the frame sheet 140s is protruded downward from the lower surface of the frame sheet 140s. A downstream side 214b of the lower base 214 is accordingly formed to be lower than an upstream side 214a of the lower base 214 in the conveying direction, so as not to interfere with the cathode diffusion layer 120.

FIG. 5A shows the state that the cathode diffusion layer sheet 120s and the frame sheet 140s are conveyed to a punching position. The upstream side 214a of the lower base 214 in the conveying direction has an upper surface that is flush with an upper surface of the lower pressing member 218.

FIG. 5B shows the state that the blades 200 are pressed down. The blades 200 are tapered to punch out the cathode diffusion layer 120 from the cathode diffusion layer sheet 120s while stretching out the cutting surface of the cathode diffusion layer sheet 120s and to further bite into the frame sheet 140s. The upper pressing member 216 may be moved with the blades 200.

FIG. 5C shows the state that the cathode diffusion layer sheet 120s and the frame sheet 140s are punched by the blades 200. The upper pressing member 216 is pressed down to a position where the upper surface of the cathode diffusion layer 120 is flush with the upper surface of the frame sheet 140s. The blades 200 are tapered to stretch out the opening of the frame sheet 140s, while compressing the cathode diffusion layer 120 to narrow its area. This causes the cathode diffusion layer 120 to be placed inside of the opening of the frame sheet 140s. The blades 200 are then pulled up, while keeping this positioning. The cathode diffusion layer 120 is accordingly fit in the opening of the frame sheet 140s. The frame sheet 140s with the cathode diffusion layer 120 fit therein is conveyed to a subsequent process. The downstream side 214b of the lower base 214 in the conveying direction is formed lower than the upstream side 214a, so that the frame sheet 140s is conveyable without causing the cathode diffusion layer 120 to interfere with the downstream side 214b of the lower base 214 in the conveying direction. The frame remaining part 140a is left on the lower pressing member 218 when the blades 200 are pulled up, and may be discharged in a direction intersecting with the conveying direction of the frame sheet 140s.

FIGS. 6A-6D are diagrams illustrating a bonding device and a bonding process of bonding an anode-side member to the frame sheet 140s with the cathode diffusion layer 120 fit therein. An anode-side member bonding device 30 includes an upper pressing plate 310 and a lower pressing plate 320. An anode-side member 135 includes the CCM 110 and the anode diffusion layer 130. The CCM 110 includes a cathode catalyst layer 112 and an anode catalyst layer 113. The anode-side member 135 is provided in advance by bonding the electrolyte membrane 111 with the anode catalyst layer 113 formed thereon to the anode diffusion layer 130 and applying the cathode catalyst layer on the electrolyte membrane 111. The size of the cathode catalyst layer 112 is substantially the same as the size of the cathode diffusion layer 120. It is preferable that the size of the cathode catalyst layer 112 is slightly larger than the cathode diffusion layer 120. The sizes of the electrolyte membrane 111 and the anode catalyst layer 113 are substantially the same and are larger than the size of the cathode catalyst layer 112. The outer periphery of the electrolyte membrane 111 is extended outward from the cathode catalyst layer 112. The anode diffusion layer 130 is placed on an outer surface side (lower side in the drawing) of the anode catalyst layer 113 across a microporous layer 116 (hereinafter called "MPL 116"). The size of the anode diffusion layer 130 is substantially the same as the size of the anode catalyst layer 113. The MPL 116 may be omitted as appropriate.

Figure 6A:
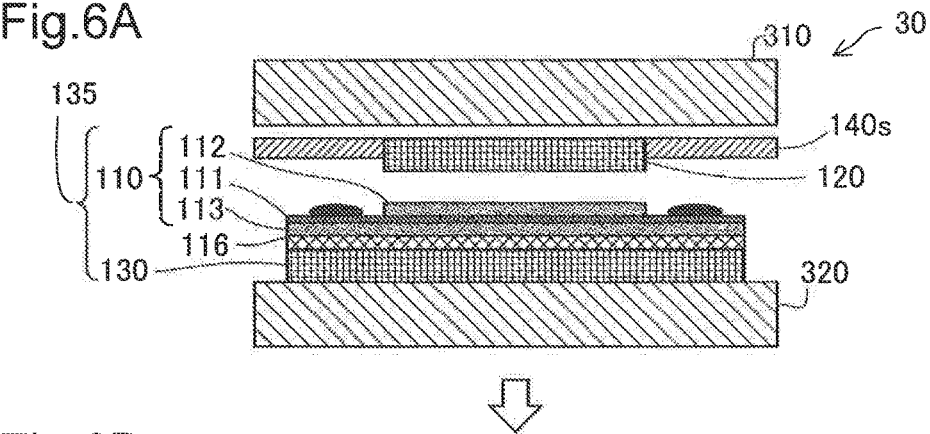
FIGS. 6A-6D are diagrams illustrating a bonding device and a bonding process of bonding an anode-side member to the frame sheet with the cathode diffusion layer fit therein.

In FIG. 6A, an adhesive is applied on an area of the electrolyte membrane 111 extended outward from the cathode catalyst layer 112, and the cathode diffusion layer 120 is positioned to be laid on the cathode catalyst layer 112. Using a transparent material for the frame sheet 140s allows such positioning to be visually checked and thus enhances the positioning accuracy.

Figure 6B:
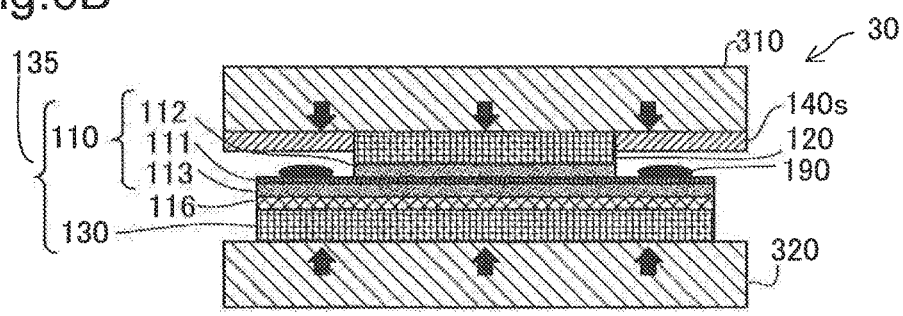

In FIG. 6B, the upper pressing plate 310 is moved downward to come into contact with the cathode diffusion layer 120 and the frame sheet 140s, while the lower pressing plate 320 with the anode-side member 135 mounted thereon is moved upward.

Figure 6C:
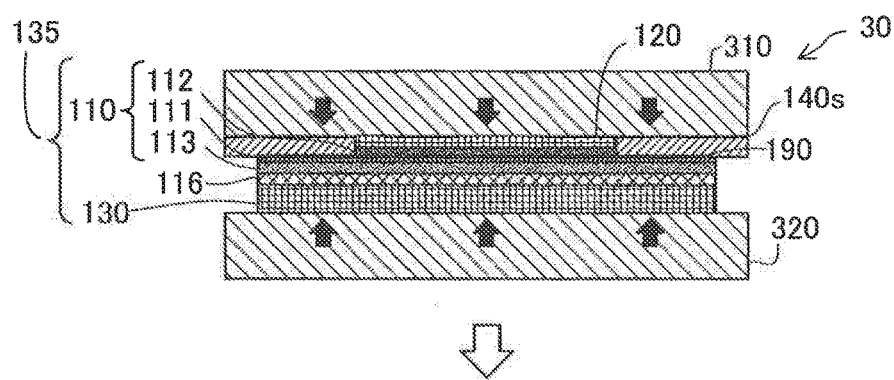

In FIG. 6C, the cathode diffusion layer 120 is compressed in the vertical direction, so that the adhesive 190 comes into contact with the frame sheet 140s to bond the frame sheet 140s to the CCM 110. The anode diffusion layer 130 may also be compressed in the vertical direction by moving the upper pressing plate 310 and the lower pressing plate 320. The adhesive 190 may be an ultraviolet curable adhesive as described above. In this application, the upper pressing plate 310 may be made of an ultraviolet transmitting material, such as quartz.

Figure 6D:
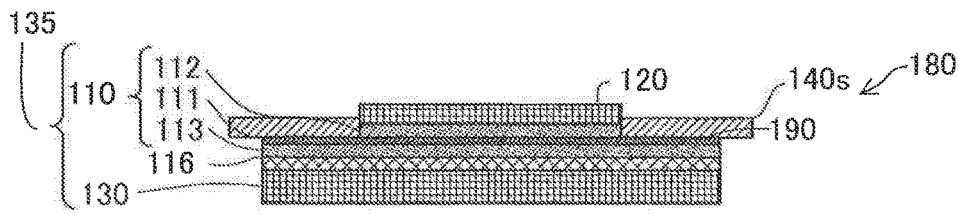

FIG. 6D shows the electrode frame assembly for fuel cell 180 thus manufactured. Compared with the state of FIG. 6C, the cathode diffusion layer 120 is relieved to the less compressed state and is protruded upward from the frame sheet 140s. In the state that the electrode frame assembly for fuel cell 180 is placed in the fuel cell stack 10 as shown in FIG. 1, the cathode diffusion layer 120 is compressed to the state of FIG. 6C by the binding force of the fuel cell stack 10. In the conventional manufacturing process of the electrode frame assembly for fuel cell shown in FIGS. 3A-3E, there is a clearance between the frame 140 and the cathode diffusion layer 120. When a large amount of the adhesive 190 is applied to eliminate any area without application of the adhesive 190, the adhesive 190 is likely to be spread upward through the clearance between the frame 140 and the cathode diffusion layer 120 and cause some trouble. Accordingly, it is difficult to apply a large amount of the adhesive 190, and this may leave a non-applied area due to the insufficient amount of the adhesive 190. In the manufacturing process of this embodiment, on the other hand, there is substantially no clearance between the frame sheet 140s and the cathode diffusion layer 120, and the adhesive 190 is unlikely to be spread upward through the clearance. This allows a required amount of the adhesive 190 to be applied.

Figure 7A:
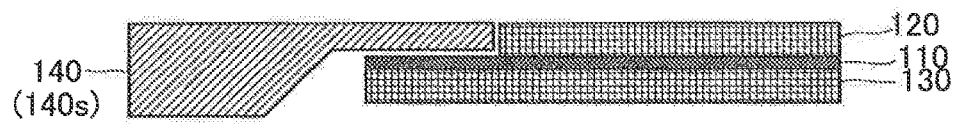
FIGS. 7A-7D are diagrams illustrating various configurations of the frame and the MEA.
Figure 7B:
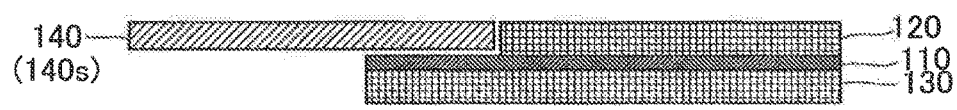
Figure 7C:
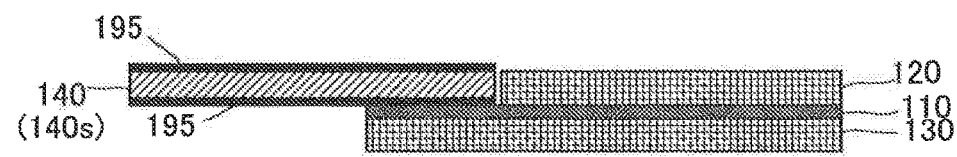
Figure 7D:
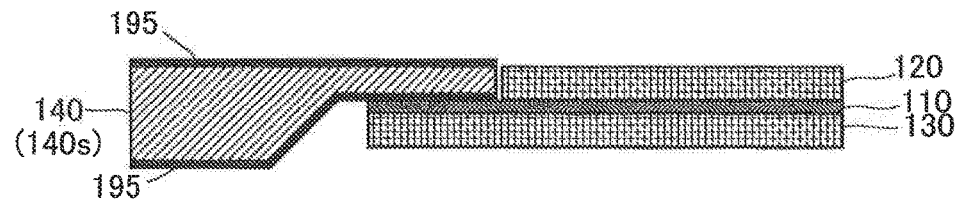

FIGS. 7A-7D are diagrams illustrating various configurations of the frame and the MEA. FIG. 7A shows a stepped configuration of the frame 140 (or frame sheet 140s) described above. The frame 140 may not be necessarily in a stepped configuration as shown in FIG. 7B. The frame 140 may have sealing portions formed by simultaneously extrusion molding an adhesive polymer on the surfaces thereof. This application allows for reduction of the adhesive for bonding the frame 140 to the CCM 110. FIGS. 7C and 7D respectively show frames with sealing portions in a stepless configuration and in a stepped configuration.

Second Embodiment

Figure 8:
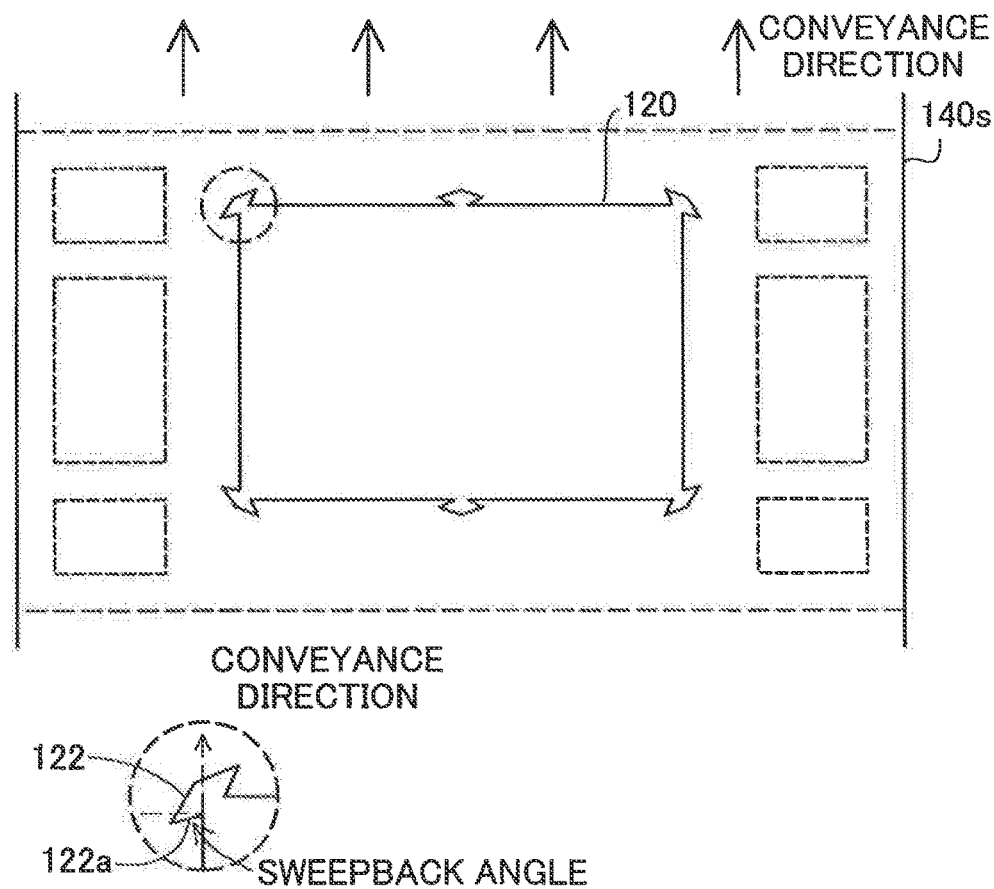
FIG. 8 is a diagram illustrating a frame sheet and a cathode diffusion layer according to a second embodiment.

FIG. 8 is a diagram illustrating a frame sheet 140s and a cathode diffusion layer 120 according to a second embodiment. The second embodiment differs from the first embodiment by a shape punched out by the blades 200. The shape punched out by the blades 200 is a rectangular shape in the first embodiment but is a rectangular shape with fitting shapes 122 in the second embodiment as shown in FIG. 8. According to this embodiment, the fitting shapes 122 are protruding shapes protruded from the outer periphery of the rectangle viewed from the cathode diffusion layer 120-side and are provided at four corners of the rectangle and approximate centers of the respective longitudinal sides. The fitting shapes 122 are constricted at their bases and are provided on the sides parallel to the conveying direction or the both ends of the parallel side. A rear side 122a in the conveying direction of the fitting shape 122 forms a sweepback portion having a sweepback angle relative to the conveying direction. The presence of the fitting shapes 122 causes the rear sides 122a to engage with the frame sheet 140s. This configuration makes the cathode diffusion layer 120 unlikely to be slipped off from the opening of the frame sheet 140s during conveyance.

Figure 9:
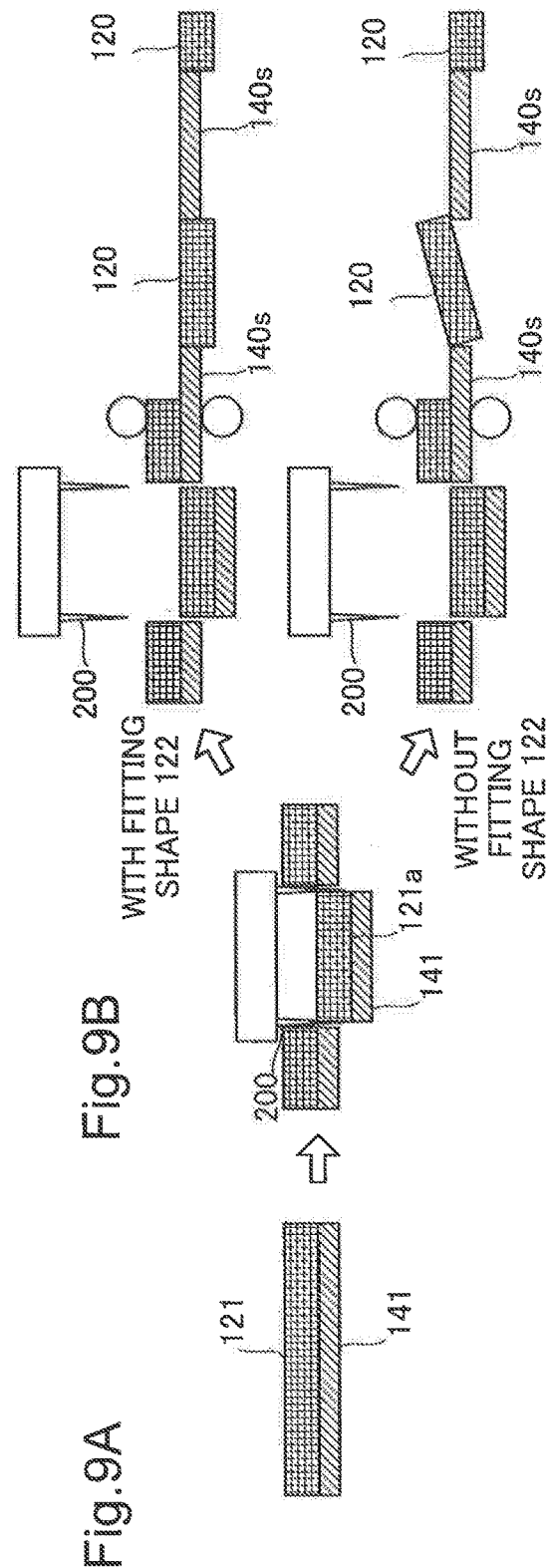
FIGS. 9A-9D are diagrams illustrating the advantageous effects of the presence of the fitting shapes.

FIGS. 9A-9D are diagrams illustrating the advantageous effects of the presence of the fitting shapes 122. When the punched-out shape does not have the fitting shapes 122, it is likely that the cathode diffusion layer 120 is slipped off from the opening of the frame sheet 140s during conveyance as shown in FIG. 9D (lower right drawing). When the punched-out shape has the fitting shapes 122, on the other hand, it is unlikely that the cathode diffusion layer 120 is slipped off from the opening of the frame sheet 140s during conveyance as shown in FIG. 9C (upper right drawing).

Figure 10:
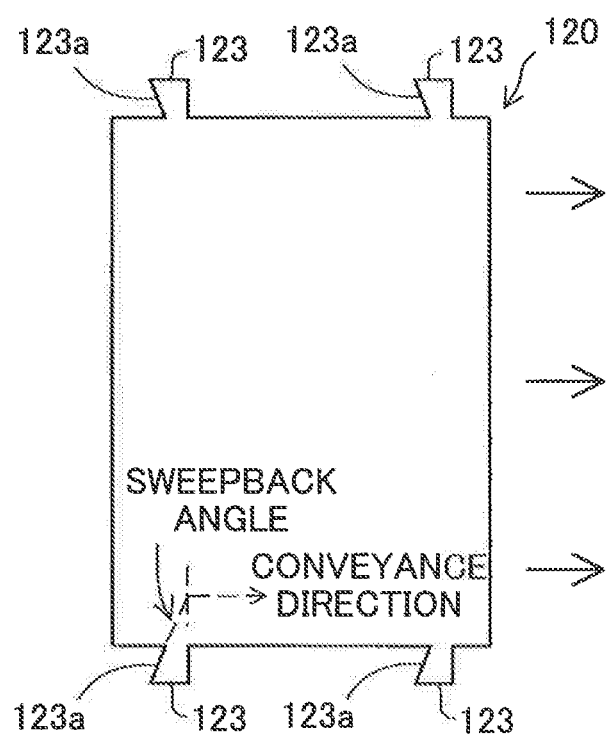
FIG. 10 is a diagram illustrating a modification of fitting shapes.

FIG. 10 is a diagram illustrating a modification of fitting shapes. In this modification, fitting shapes 123 are provided on respective sides parallel to the conveying direction. The fitting shapes 123 are constricted at their bases, such that a rear side 123a in the conveying direction of the fitting shape 123 has a sweepback angle relative to the conveying direction. The fitting shapes 122 are provided at four corners in the illustrated example of FIG. 8 and the fitting shapes 123 are provided on two sides parallel to the conveying direction in the illustrated example of FIG. 10. The fitting shape 122 or 123 may be necessarily provided in at least one location, i.e., at any of four corners or on either of two sides parallel to the conveying direction.

Third Embodiment

Figure 11:
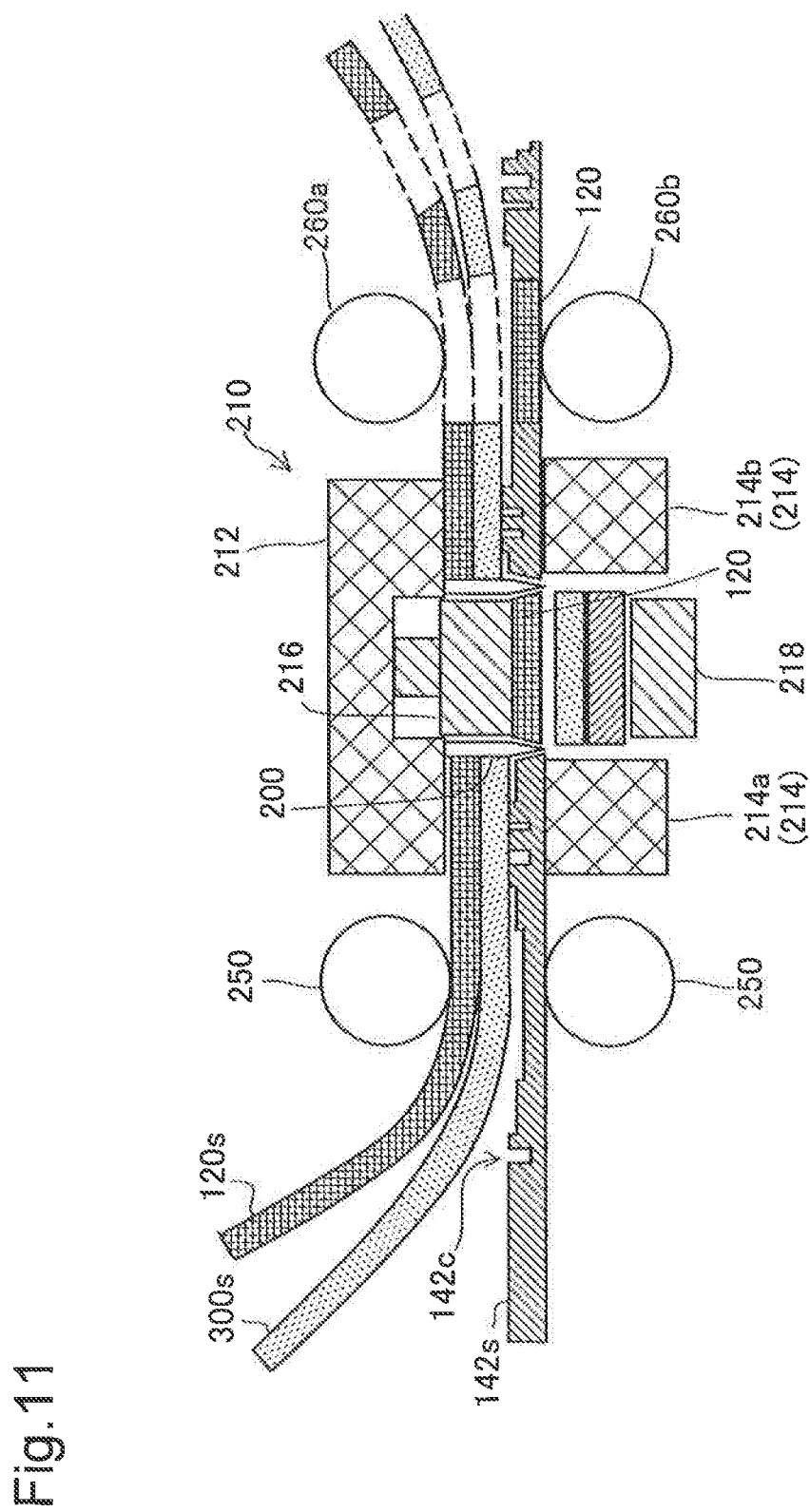
FIG. 11 is a diagram illustrating a third embodiment.

FIG. 11 is a diagram illustrating a third embodiment. A frame sheet 142s of the third embodiment has a stepped portion 142c. According to the third embodiment, a cushion sheet 300s is placed between the frame sheet 142s and a cathode diffusion layer sheet 120s which are stacked one on the other. In other words, the cushion sheet 300s serves to relieve the stepped portion 142c of the frame sheet 142s in the third embodiment. The cushion sheet 300s is made of, for example, a foamed sheet of 200 am to 300 am in thickness. The cushion sheet 300s may be made of a material other than the foamed sheet, for example, paper or nonwoven fabric. The other configuration of the third embodiment is similar to that described above with reference to FIGS. 5A-5D.

Figure 12A:
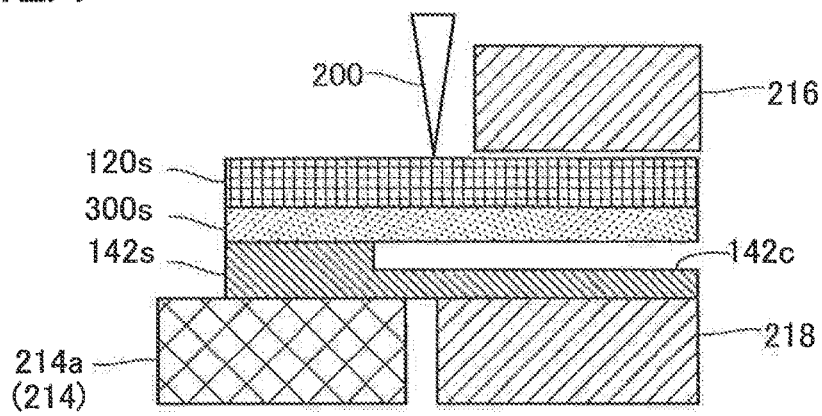
FIGS. 12A-12C are diagrams illustrating a process of punching out the cathode diffusion layer according to the third embodiment.
Figure 12B:
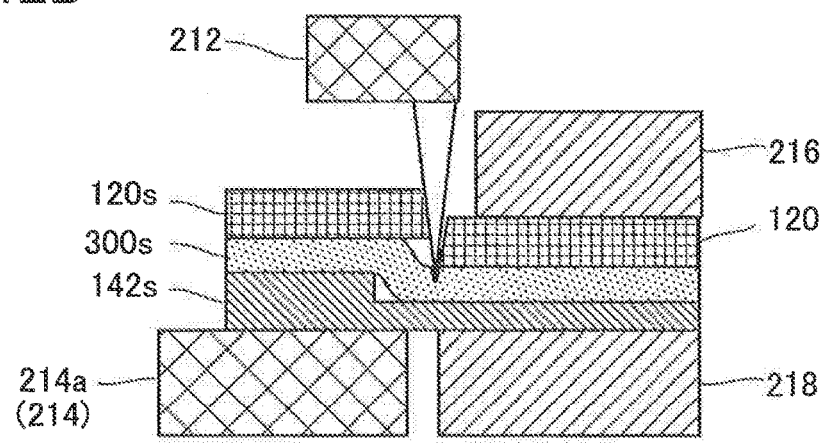
Figure 12C:
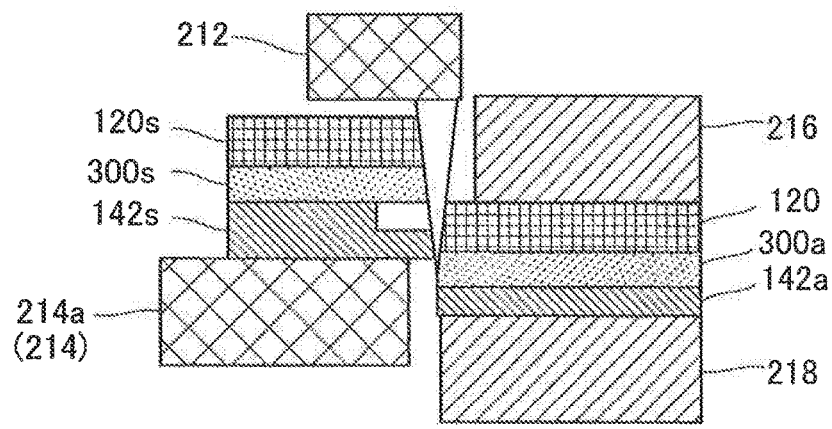

FIGS. 12A-12C are diagrams illustrating a process of punching out the cathode diffusion layer 120 according to the third embodiment. FIG. 12A shows the state that the cathode diffusion layer sheet 120s, the cushion sheet 300s and the frame sheet 142s are conveyed to a punching position. FIG. 12B shows the state that the blades 200 are pressed down. The blades 200 are tapered to punch the cathode diffusion layer sheet 120s while stretching out the cutting surface of the cathode diffusion layer sheet 120s and to further bite into the cushion sheet 300s. The cushion sheet 300s is pressed downward by the upper pressing member 216 and the punched-out cathode diffusion layer 120 to be in close contact with the frame sheet 142s.

In FIG. 12C, the blades 200 bite into the frame sheet 142s and punch the frame sheet 142s while stretching out the cutting surface of the frame sheet 142s. The blades 200 in the tapered shape further stretch out the cutting surface of the cathode diffusion layer 120. The upper pressing member 216 is pressed down to a position where the cathode diffusion layer 120 is flush with the frame sheet 142s as shown in FIG. 12C. The blades 200 in the tapered shape stretch out the opening of the frame sheet 142s, while compressing the cathode diffusion layer 120 to narrow the area. This causes the cathode diffusion layer 120 to be placed inside of the opening of the frame sheet 142s. The blades 200 are then pulled up, while keeping this positioning. The cathode diffusion layer 120 is accordingly fit in the opening of the frame sheet 142s. The frame sheet 142s with the cathode diffusion layer 120 fit therein is conveyed to the process of bonding the anode-side member described above with reference to FIGS. 6A-6D. A cushion sheet remaining part 300a and a frame remaining part 142a are left on the lower pressing member 218 when the blades 200 are pulled up, and may be discharged in a direction intersecting with the conveying direction of the frame sheet 142s.

As described above, in the case where the frame sheet 142s has the stepped portion 142c, the cathode diffusion layer 120 is fit in the opening of the frame sheet 142s by placing the cushion sheet 300s between the cathode diffusion layer sheet 120s and the frame sheet 142s.

Fourth Embodiment

Figure 13:
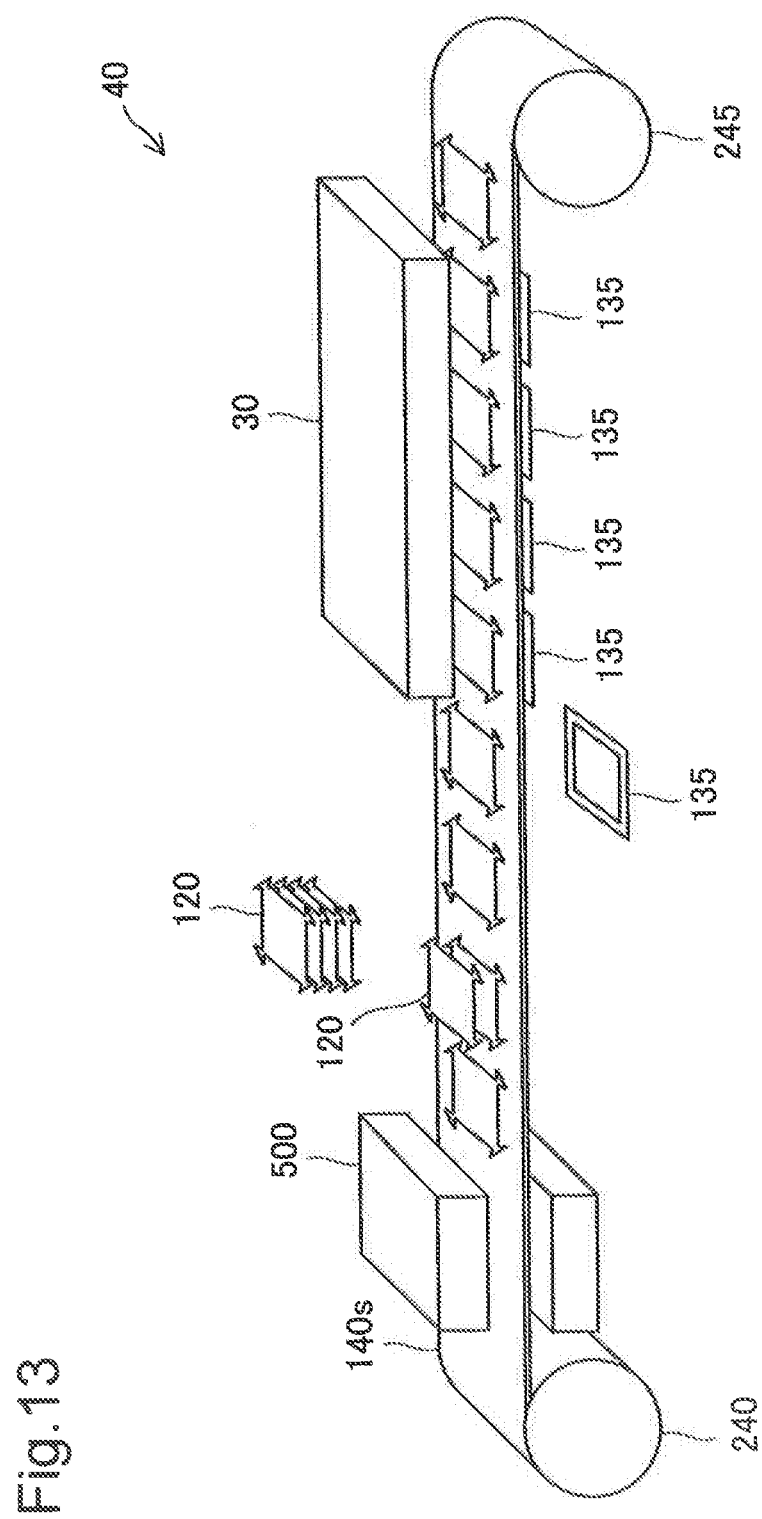
FIG. 13 is a diagram illustrating a fourth embodiment.

FIG. 13 is a diagram illustrating a fourth embodiment. The manufacturing processes of the first to the third embodiments fit the cathode diffusion layer 120 in the frame sheet 140s (or the frame sheet 142s) simultaneously with pulling up the blades 200. In the fourth embodiment, on the other hand, a process of punching out the cathode diffusion layer 120 is provided separately from a process of fitting the cathode diffusion layer 120 in the frame sheet 140s.

A manufacturing apparatus 40 of an electrode frame assembly for fuel cell includes a punching device 500, a frame sheet feeding roller 240, an anode-side member bonding device 30 and a winding roller 245. The configuration of the punching device 500 of this embodiment is similar to the configuration of the punching device 500 described above with reference to FIGS. 5A-5D. The configuration of the anode-side member bonding device 30 of this embodiment is similar to the configuration of the anode-side member bonding device 30 described above with reference to FIGS. 6A-6D. According to this embodiment, the punching device 500 has blades 200 arranged to punch only the frame sheet 140s. The punched-out frame remaining part 140a is not fit in the frame sheet 140s but is discharged in the direction intersecting with the conveying direction. According to this embodiment, the cathode diffusion layer 120 is punched out and formed in advance from the cathode diffusion layer sheet 120s.

The manufacturing process of this embodiment bonds the anode-side member 135 after fitting the cathode diffusion layer 120 in the frame sheet 140s. There is accordingly no need to take into account tolerances and errors in the process of forming the openings of the frame sheet 140s and in the process of forming and placing the cathode diffusion layers 120. This also makes the outer periphery of the cathode diffusion layer 120 unlikely to be laid on the frame sheet 140s and reduces the possibility of leakage of the reactive gas. This also enables the cathode diffusion layers 120 to be conveyed with the frame sheet 140s. In the first to the third embodiments, the cathode diffusion layer sheet 120s and the frame sheet 140s are stacked on each other in advance, so that the cathode diffusion layer sheet 120s and the frame sheet 140s have identical lengths in the conveying direction for one power generation unit 100. In this embodiment, on the other hand, the length of the cathode diffusion layer sheet 120s in the conveying direction for one power generation unit 100 may be set shorter than the length of the frame sheet 140s in the conveying direction for one power generation unit 100. This reduces consumption of the cathode diffusion layer sheet 120s.

Fifth Embodiment

Figure 14A:
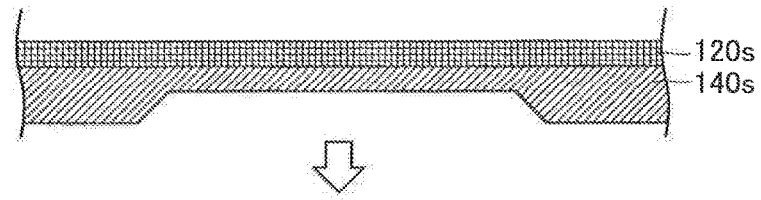
FIGS. 14A-14F are diagrams illustrating a fifth embodiment.
Figure 14B:
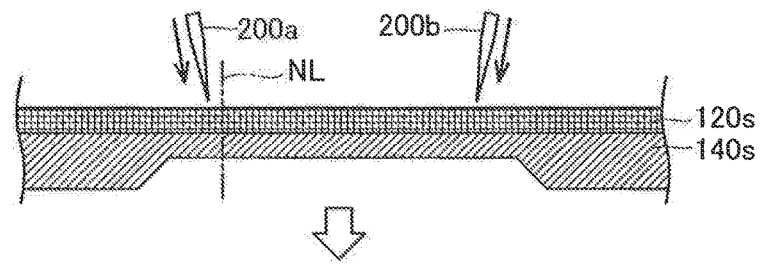

FIGS. 14A-14F are diagrams illustrating a fifth embodiment. The difference from the first embodiment shown in FIGS. 2A-2F is the moving direction of blades 200a and 200b. In the first embodiment of FIG. 2, the blades 200 move in the direction parallel to the normal NL of the cathode diffusion layer sheet 120s as shown in FIG. 2B. In the fifth embodiment, on the other hand, the blades 200a and 200b are arranged such that the interval between the ends of the blades 200a and 200b is narrower than the interval between the bases of the blades 200a and 200b as shown in FIG. 14B.

Figure 14C:
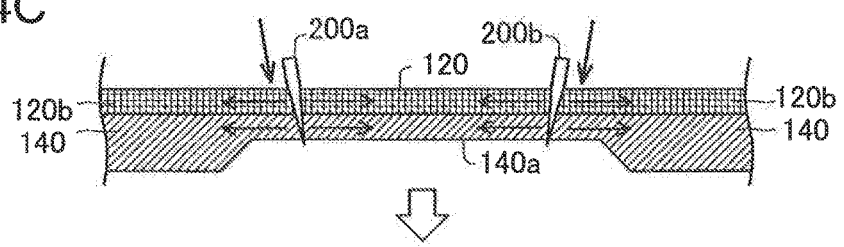
Figure 14D:
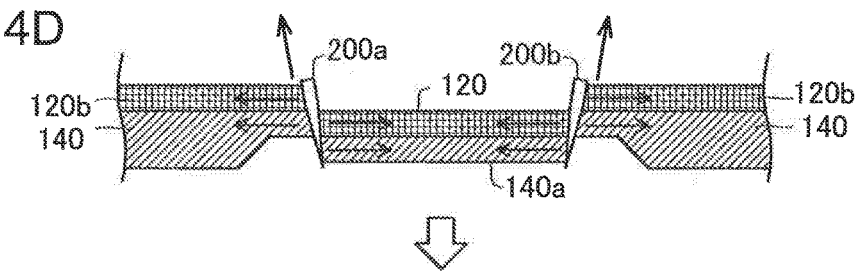
Figure 14E:
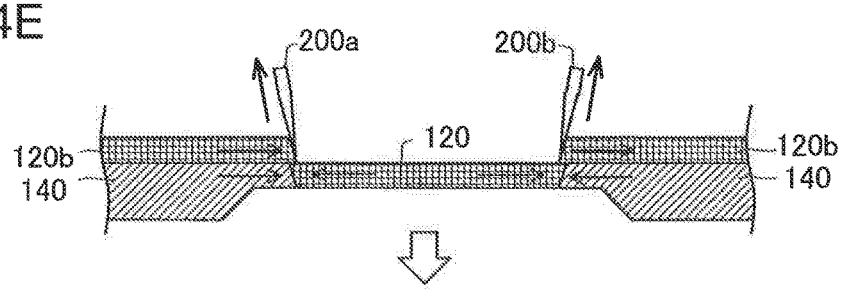

As shown in FIG. 14C, the blades 200a and 200b punch out the cathode diffusion layer 120 obliquely to the normal NL direction from the cathode diffusion layer sheet 120s such that the size of the frame 140-side surface of the punched-out cathode diffusion layer 120 in the normal NL direction is smaller than the size of the opposite surface. As shown in FIG. 14D, the blades 200a and 200b are pressed down to a position where the cathode diffusion layer 120 is substantially flush with the frame 140. The blades 200a and 200b are then pulled up, while keeping this flush position as shown in FIG. 14E. By pulling out the blades 200a and 200b, the frame remaining part 140a placed between the blades 200a and 200b falls down, and the cathode diffusion layer 120 is fit in the frame 140.

Figure 14F:
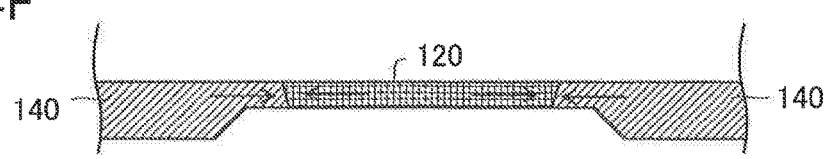

FIG. 14F shows the state that the cathode diffusion layer 120 is fit in the frame 140. The cathode diffusion layer 120 is formed in a shape tapered downward. The opening of the frame 140 is also formed in a shape tapered downward. The size of the upper side of the cathode diffusion layer 120 is larger than the size of the lower side of the opening of the frame 140. As a result, the cathode diffusion layer 120 is physically supported by the frame 140. In the first embodiment, the cathode diffusion layer 120 is held by the frictional force between the cathode diffusion layer 120 and the frame 140. In the fifth embodiment, on the other hand, the outer periphery of the cathode diffusion layer 120 is supported upward by the frame 140. This makes the cathode diffusion layer 120 unlikely to be slipped off from the frame 140, compared with the configuration of holding the cathode diffusion layer 120 by only the frictional force. The processes after FIG. 14F are identical with the processes of FIGS. 2E and 2F and are not specifically described here.

Figure 15A:
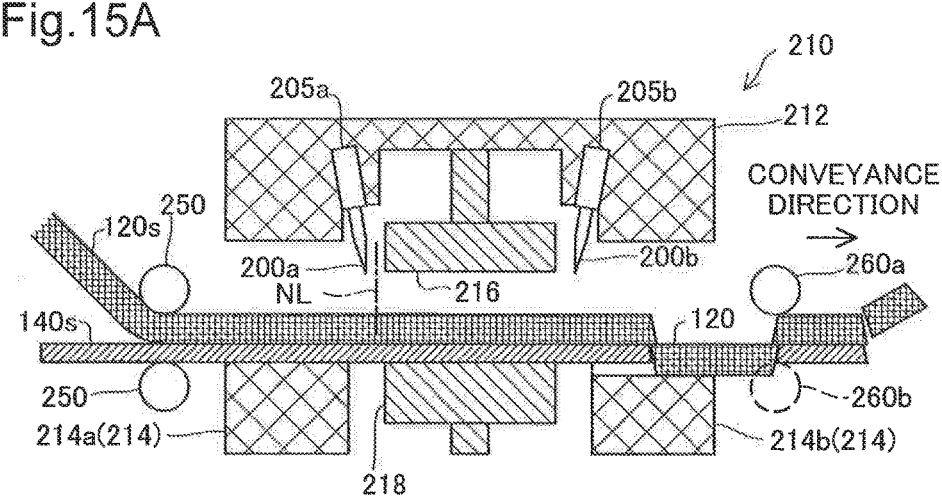
FIGS. 15A-15C are diagrams illustrating the internal configuration and the operations of a punching device according to the fifth embodiment.
Figure 15B:
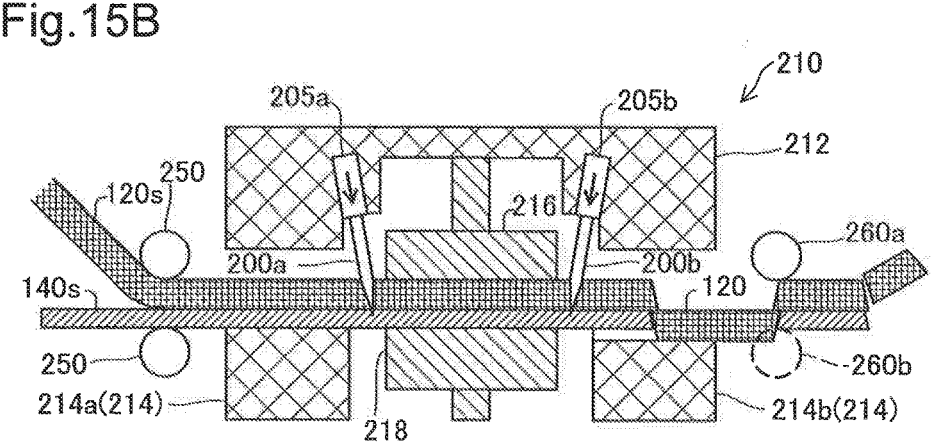
Figure 15C:
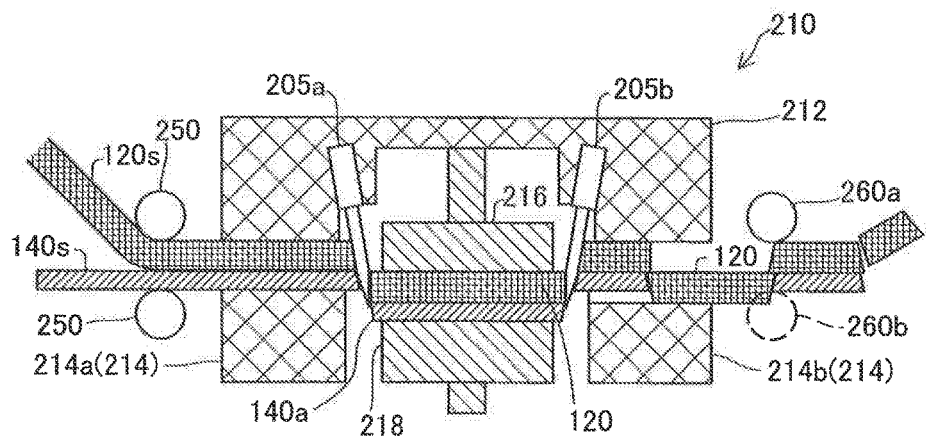

FIGS. 15A-15C are diagrams illustrating the internal configuration and the operations of a punching device 500 according to the fifth embodiment. The differences from the punching device 500 of the first embodiment shown in FIGS. 5A-5D are arranging the blades 200a and 200b such that the interval between the ends of the blades 200a and 200b is narrower than the interval between the bases of the blades 200a and 200b and additionally providing moving devices 205a and 205b to move the blades 200a and 200b in a direction oblique to the normal NL.

FIG. 15A shows the state that the cathode diffusion layer sheet 120s and the frame sheet 140s are conveyed to a punching position. The upstream side 214a of the lower base 214 in the conveying direction has an upper surface that is flush with an upper surface of the lower pressing member 218.

FIG. 15B shows the state that the blades 200a and 200b are moved obliquely to the normal NL and are pressed down toward the cathode diffusion layer sheet 120s. The blades 200a and 200b are tapered to punch out the cathode diffusion layer 120 from the cathode diffusion layer sheet 120s while stretching out the cutting surface of the cathode diffusion layer sheet 120s and to further bite into the frame sheet 140s. The upper pressing member 216 may be moved with the blades 200a and 200b.

FIG. 15C shows the state that the cathode diffusion layer sheet 120s and the frame sheet 140s are punched by the blades 200a and 200b. The upper pressing member 216 is pressed down to a position where the upper surface of the cathode diffusion layer 120 is flush with the upper surface of the frame sheet 140s. The blades 200a and 200b are tapered to stretch out the opening of the frame sheet 140s, while compressing the cathode diffusion layer 120 to narrow its area. This causes the cathode diffusion layer 120 to be placed inside of the opening of the frame sheet 140s. The blades 200a and 200b are then pulled up, while keeping this positioning. The size of the upper side of the cathode diffusion layer 120 is larger than the size of the lower side of the opening of the frame sheet 140s. As a result, the cathode diffusion layer 120 is supported by the frame sheet 140s. The subsequent processes are identical with those of the first embodiment and are thus not specifically described.

In the first embodiment, the cathode diffusion layer 120 is supported by the frame 140 by means of the stresses applied in the mutually compressing directions to the cathode diffusion layer 120 and the frame 140. In the case where these stresses are weak, there is a possibility that the cathode diffusion layer 120 is not supported by the frame 140. In the fifth embodiment, however, the size of the upper side of the cathode diffusion layer 120 is larger than the size of the lower side of the opening of the frame 140. Even in the case where the stresses are weak, this configuration enables the cathode diffusion layer 120 to be supported by the frame 140.

When a rectangular shape is punched out by the blades 200a and 200b, the blades 200a and 200b may be arranged to cut two opposed sides of the punched-out shape. The cathode diffusion layer 120 is then supported at the two sides by the frame 140.

In the fifth embodiment, the blades 200a and 200b are moved obliquely to the normal NL direction of the cathode diffusion layer 120. According to a modification, the cathode diffusion layer sheet 120s may be moved in a horizontal direction perpendicular to the vertical direction, while the blades 200a and 200b may be moved obliquely to the vertical direction (direction of gravity) to punch the cathode diffusion layer sheet 120s and the frame sheet 140s.

The foregoing describes some aspects of the invention with reference to some embodiments. The embodiments of the invention described above are provided only for the purpose of facilitating the understanding of the invention and not for the purpose of limiting the invention in any sense. The invention may be changed, modified and altered without departing from the scope of the invention and includes equivalents thereof.

REFERENCE SIGNS LIST

10 . . . fuel cell stack
20 . . . manufacturing apparatus
30 . . . anode-side member bonding device
40 . . . manufacturing apparatus
100 . . . power generation unit
110 . . . catalyst coated membrane
111 . . . electrolyte membrane
112 . . . cathode catalyst layer
113 . . . anode catalyst layer
116 . . . microporous layer
120 . . . cathode diffusion layer
120b . . . cathode diffusion layer remaining part
120s . . . cathode diffusion layer sheet
123 . . . fitting shape
122a, 123a . . . rear side
130 . . . anode diffusion layer
135 . . . anode-side member
140 . . . frame
140s, 142s . . . frame sheet
142c . . . stepped portion
150 . . . separator plate
155 . . . oxygen flow path
160 . . . separator plate
165 . . . hydrogen flow path
170 . . . cooling medium flow path
180, 181 . . . electrode frame assembly for fuel cell
190 . . . adhesive
200, 200a, 200b . . . Thomson blade (blade)
205a, 205b . . . moving device (for blade)
212 . . . upper casing
214 . . . lower base
214a . . . upstream side
214b . . . downstream side
216 . . . upper pressing member
218 . . . lower pressing member
220 . . . diffusion layer sheet feeding roller
240 . . . frame sheet feeding roller
245 . . . winding roller
250, 260, 260a, 260b . . . conveying roller
300a . . . cushion sheet remaining part
300s . . . cushion sheet
310 . . . upper pressing plate
320 . . . lower pressing plate
400 . . . frame diffusion layer assembly
500 . . . punching device
600 . . . conveying device

The invention claimed is:

1. A manufacturing method of an electrode frame assembly for a fuel cell, comprising the steps of: (a) placing a frame and a diffusion layer to be stacked; and (b) punching out the diffusion layer and the frame in the stacked state to form in the frame an opening in a shape matching with the punched-out diffusion layer.

2. The manufacturing method of the electrode frame assembly for a fuel cell according to claim 1, further comprising the step of:
fitting the punched-out diffusion layer in the opening of the frame while keeping positions of the punched-out diffusion layer and the frame in a width direction and in a length direction, during or after the step (b).

3. The manufacturing method of the electrode frame assembly for a fuel cell according to claim 1,
wherein the punched out shape is an approximately rectangular shape and has a fitting shape in at least one location among sides and corners of the approximately rectangular shape.

4. The manufacturing method of the electrode frame assembly for a fuel cell according to claim 3,
wherein the fitting shape is a protruding shape protruded from an outer periphery of the approximately rectangular shape in the punched-out diffusion layer, and is provided on a side of the approximately rectangular shape parallel to a conveying direction of the frame or a corner of the approximately rectangular shape.

5. The manufacturing method of the electrode frame assembly for a fuel cell according to claim 4,
wherein the fitting shape in the punched-out diffusion layer includes a sweepback portion having a sweepback angle relative to the conveying direction.

6. The manufacturing method of the electrode frame assembly for a fuel cell according to claim 1,
wherein the punching out the diffusion layer and the frame in the stacked state in the step (b) comprises punching from a diffusion layer side of the stack obliquely to a normal direction of the diffusion layer, such that a size of a frame side surface of the punched-out diffusion layer is smaller than a size of an opposite side surface of the punched-out diffusion layer opposite to the frame side surface.

7. The manufacturing method of the electrode frame assembly for a fuel cell according to claim 1,
wherein the diffusion layer is made of carbon paper.

8. The manufacturing method of the electrode frame assembly for a fuel cell according to claim 1,
wherein the frame is made of a transparent resin.

9. A manufacturing apparatus of an electrode frame assembly for a fuel cell, comprising
a first roller which a sheet of diffusion layer is wound on;
a second roller which a sheet of frame is wound on;
a conveying device that is configured to convey the sheet of diffusion layer and the sheet of frame; and
a punching device that is configured to simultaneously punch the sheet of diffusion layer and the sheet of frame in a stacked state to form in the frame an opening in a shape matching with the punched-out diffusion layer.

10. The manufacturing apparatus of the electrode frame assembly for a fuel cell according to claim 9,
wherein the punching device comprises: blades that are provided for punching; and
a pressing member that is configured to press the punched-out diffusion layer and make the punched-out diffusion layer fit in the opening of the frame when the blades are pulled back after the punching.

11. The manufacturing apparatus of the electrode frame assembly for a fuel cell according to claim 9,
wherein the punched out shape is an approximately rectangular shape and has a fitting shape in at least one location among sides and corners of the approximately rectangular shape.

12. The manufacturing apparatus of the electrode frame assembly for a fuel cell according to claim 11,
wherein the fitting shape is a protruding shape protruded from an outer periphery of the approximately rectangular shape in the punched-out diffusion layer, and is provided on a side of the approximately rectangular shape parallel to a conveying direction of the frame or a corner of the approximately rectangular shape.

13. The manufacturing apparatus of the electrode frame assembly for a fuel cell according to claim 12,
wherein the fitting shape in the punched-out diffusion layer includes a sweepback portion having a sweepback angle relative to the conveying direction.

14. The manufacturing apparatus of the electrode frame assembly for a fuel cell according to claim 9,
wherein a punched out shape is a rectangular shape, and blades provided to punch two opposed sides of the rectangular shape are arranged to punch the sheet of diffusion layer and the sheet of frame from a diffusion layer side of the stack obliquely to a normal direction of the diffusion layer, such that a size of a frame side surface of the punched-out diffusion layer is smaller than a size of an opposite side surface of the punched-out diffusion layer opposite to the frame side surface.

15. The manufacturing apparatus of the electrode frame assembly for a fuel cell according to claim 9,
wherein the diffusion layer is made of carbon paper.

16. The manufacturing apparatus of the electrode frame assembly for a fuel cell according to claim 9,
wherein the frame is made of a transparent resin.

* * * * *